United States Patent
Debaisieux et al.

(10) Patent No.: US 6,739,029 B2
(45) Date of Patent: May 25, 2004

(54) MANUFACTURING PROCESS FOR A GROOVED STRUCTURE AND STRUCTURE OBTAINED BY THIS PROCESS

(75) Inventors: Stéphane Debaisieux, Feluy (BE); Christian Overbergh, Court-St-Etienne (BE); Sébastien Quets, Ittre (BE)

(73) Assignee: Sonaca S.A., Gosselies (BE)

( * ) Notice: Subject to any disclaimer, the term of this patent is extended or adjusted under 35 U.S.C. 154(b) by 0 days.

(21) Appl. No.: 10/339,931

(22) Filed: Jan. 10, 2003

(65) Prior Publication Data

US 2003/0136815 A1 Jul. 24, 2003

(30) Foreign Application Priority Data

Jan. 11, 2002 (BE) .............................. 20020014

(51) Int. Cl.[7] .......................... B23P 17/00; B21D 53/88
(52) U.S. Cl. ..................... 29/421.1; 29/897.2; 72/61; 228/157
(58) Field of Search ...................... 29/421.1, 889.7, 29/889.71, 889.72, 897.2; 72/56, 58, 60, 61; 228/157, 181, 193; 244/123, 124

(56) References Cited

U.S. PATENT DOCUMENTS

| | | | |
|---|---|---|---|
| 2,690,002 A | 9/1954 | Grenell | 29/890.042 |
| 3,933,327 A | 1/1976 | Cook et al. | 244/134 B |
| 5,115,963 A | 5/1992 | Yasui | 228/157 |
| 5,330,092 A | 7/1994 | Gregg et al. | 228/157 |
| 5,431,327 A * | 7/1995 | Dunford et al. | 228/157 |
| 5,797,239 A | 8/1998 | Zaccone et al. | 52/793.1 |
| 5,881,459 A * | 3/1999 | Yasui | 29/897.32 |
| 5,941,446 A | 8/1999 | Yasui | 228/157 |
| 5,975,465 A | 11/1999 | Donal et al. | 244/123 |
| 6,050,523 A | 4/2000 | Kraenzien | 244/123 |
| 6,571,450 B2 * | 6/2003 | Yajima | 29/421.1 |

FOREIGN PATENT DOCUMENTS

| | | |
|---|---|---|
| EP | 0 376 371 A2 | 12/1989 |
| EP | 0 527 575 A1 | 7/1992 |
| EP | 0 893 342 A2 | 7/1998 |
| WO | WO 98/47761 | 10/1998 |

* cited by examiner

Primary Examiner—Irene Auda-Rosenboom
Assistant Examiner—Marc Jimenez
(74) Attorney, Agent, or Firm—Pearne & Gordon LLP (57) ABSTRACT

A structure (10) in the shape of an aerodynamic panel in which adjacent cells (20a, 20b) are formed by placing a stack of three metal plates in a mold. After diffusion welding of the plates at the required locations, a first variable pressure is applied in a first series of cells (20a) formed between the outer plate and the intermediate plate and a second independent pressure approximately constant and lower than the first is applied in the other cells (20b) and on the inner face of the stack. Thus, this partially forms the cells and shapes the structure in contact with a complementary surface of the mold. The final conformation of the cells and the structure is obtained by applying a second pressure cycle in the cells and on the inner face of the stack.

13 Claims, 5 Drawing Sheets

MANUFACTURING PROCESS FOR A GROOVED STRUCTURE AND STRUCTURE OBTAINED BY THIS PROCESS

DESCRIPTION

1. Technical Field

The invention mainly relates to a process for manufacturing a generally aerodynamically-shaped structure in which adjacent channels or grooves are formed. More precisely, the manufacturing process according to the invention uses the SPFDB (SuperPlastic Forming and Diffusion Bonding) technique.

The invention also relates to an aerodynamic structure obtained using this process.

One of the preferred applications of the invention is in the aeronautical industry. In particular, the process according to the invention is used to make a fixed or mobile flap substructure provided with internal grooves, for a leading edge. These grooves may be used particularly for controlling the airflow or for defrosting outer surfaces.

However, the invention can also be used in other technical fields, to make all types of ducts integrated into a structure or all types of panels stiffened by the partitions separating the grooves.

2. State of the Art

In order to make aircraft safe and to improve their performances, the leading edge of wings, tail fins, control surfaces, and jet air intakes, are usually equipped with devices that prevent the formation of ice or control the air flow over the aerodynamic surfaces of these various elements.

Document U.S. Pat. No. 3,933,327 shows a deicing device of a jet pod, in which the leading edge comprises two skins leading warm air towards radial passages that open out onto a honeycomb sandwich structure. This structure is perforated to carry warm air towards the outside skin of the pod in order to prevent the formation of ice. It also enables acoustic attenuation of noise emitted by the flow. The two skins and the warm air passages are made by the use of conventional manufacturing processes used in aeronautics.

Document WO-A-98/47761 shows the leading edge of an aircraft wing formed from two parallel skins connected to each other by stiffeners, in order to define a partitioned structure capable of resisting aerodynamic forces. The spaces delimited between the skins and the stiffeners form communication areas for air drawn in through perforations passing through the outer skin. Air drawn in from the inside of the leading edge reduces turbulence on the contour of the leading edge. This has the effect of reducing drag on the wing and consequently improving aircraft performances. This type of structure is made using a number of special tools, and particularly jigs for positioning and assembling the stiffeners on the two skins, but this tends to increase manufacturing costs and times.

Document U.S. Pat. No. 6,050,523 describes a leading edge structure that comprises a substructure made of a composite material and a titanium skin glued to this substructure. In the direction of the wing, the substructure comprises circular ducts facing perforations made in the skin. It is very difficult to make such a structure since it involves the use of different techniques to form the skin with the required profile and to obtain the substructure from a composite material. A combination of these two techniques for manufacturing and assembly of the skin on the substructure require long and complex operations.

Document EPA-0 376 371 describes a structure designed to avoid the formation of ice on the aerodynamic surfaces of an aircraft such as the wings and flaps, by the use of a warm fluid circulating in ducts arranged along the chord of a section and from one part to the next, over the entire length of the wing. The manufacturing process used to make the leading edge of the wing and the deicing ducts at the same time uses a set of moulds that reproduces the outer shape of the leading edge and the shape of the ducts. According to this process, the plates are prepared and then partially assembled by a metallurgical operation. They are then preformed and placed between a male mould that defines the outer contour of the structure and a female mould that defines the shape of the ducts. A heat source then enables the plates to deform plastically under the action of a gas to match the shape of the female mould.

Document U.S. Pat. No. 2,690,002 relates to a process for making a thin structure for a heat exchanger. The structure is made by placing one of the two plates on top of the other. These two plates are separated at the locations at which the ducts will be formed, using a material that will prevent their assembly during a subsequent hot rolling operation. When the said operation has been done and the plates are assembled, a fluid is injected under pressure between the plates to form the ducts symmetrically on each side of the plates. If it is desired that the ducts should only deform on one of the faces of the structure, the plate opposite this face is made thicker such that it is sufficiently stiff to prevent it from deforming. This technique, that is based on a free expansion of the plates, does not use a mould to form the different parts of the structure, unless a particular prismatic section, for example a triangular shape, is required for the ducts.

Both of the manufacturing processes described in documents EP-A-0 376 371 and U.S. Pat. No. 2,690,002 use a pressure cycle to make the structure, which requires either the use of forms and mating forms, or a symmetric structure to balance forces while the ducts are being formed.

Presentation of the Invention

The invention mainly relates to a manufacturing process for a grooved structure for which the innovative design solves at least some of the problems that arise when making structures using the processes according to prior art.

More precisely, the purpose of the invention is a particularly simple and inexpensive process for making a grooved structure without the use of complex tooling or procedures.

According to the invention, this objective is achieved by using a process for manufacturing at least one metallic structure comprising a smooth outer skin, an inner skin and partitions connecting the said skins by delimiting adjacent cells from each other, the said process being characterized in that it comprises the following main steps:

placement of at least one stack of three metallic plates T1, T2, T3 superposed in a mould comprising a surface complementary to the smooth outer skin of the structure to be made, with the insertion of an anti-diffuser between the plates in regions that are not to be assembled;

heating of the stack of plates and execution of a plate diffusion welding cycle, outside the said regions that are not to be assembled;

partial formation of the cells and shaping of the structure by making a first phase in a pressure cycle, consisting of applying a first pressure in the first regions R1 delimited between a first plate T1 adjacent to the said mould surface and an intermediate plate T3 in the said stack and a second approximately constant pressure independent of and lower than the first pressure, on the face of the third plate T2 opposite the said surface and in the second regions R2 delimited between the third plate T2 and the intermediate plate T3;

final conformation of the cells and the outer skin by carrying out a second phase in the pressure cycle consisting of simultaneously applying an approximately equal pressure in the first regions R1 and the second regions R2, and on the said face of the third plate T2.

The process according to the invention is based on the fact that the pressures applied firstly in the first regions R1 corresponding to one out of every two cells in the manufactured structure, and secondly in the second regions R2 (the other cells) on the face of the stack corresponding to the inner skin of the manufactured structure, are independent. During the first phase of the pressure cycle, the cells are partially formed by inflation of the first regions. During the second phase of the pressure cycle, the cells and the outer skin are brought into their final shape to create the required smooth nature. This is done by progressively applying the stack in contact with the mould while maintaining the pressure on all the cells.

In a first preferred embodiment of the invention, the first pressure applied in the first regions R1 gradually increases up to a predetermined value, during about a first half of the duration of the first phase of the pressure cycle, and then remains constant until the end of the said first phase, when the first pressure goes down very quickly to a value equal to the value of the second pressure applied in the second regions R2 and on the said face of the third plate T2.

Advantageously, the predetermined value of the first pressure applied in the first regions R1 during the first phase of the pressure cycle is approximately equal to four times the second pressure then applied in the second regions R2 and on the said face of the third plate T2.

According to another aspect of this preferred embodiment, the total duration of the first phase of the pressure cycle is about 60 minutes.

According to another aspect of this preferred embodiment, the second pressure applied in the second regions R2 and on the said face of the third plate T2 remains approximately constant and equal to about one bar during the first phase of the pressure cycle.

According to another aspect of the preferred embodiment of the invention, the pressures in the first and second regions R1, R2 and on the said face of the third plate T2 increase regularly during the second phase of the pressure cycle until a final determined pressure is obtained, preferably equal to about 9 bars.

Advantageously, the duration of the second phase of the pressure cycle is approximately equal to the duration of the first phase of the pressure cycle.

According to a particular embodiment of the invention, two stacks of plates are placed simultaneously in the mould and the said stacks are separated during a preliminary phase of the pressure cycle, during which a low and identical pressure is applied for a very short time in the first and second regions R1, R2, and on the said face of the third plate T2, the preliminary phase of the pressure cycle preceding the first phase of the pressure cycle.

In this particular embodiment, the preliminary phase of the pressure cycle advantageously lasts for about one minute and the pressure applied during this preliminary phase is about 1 bar.

Specifically, the first pressure is advantageously applied through at least one distribution channel towards which the first regions R1 are open.

Advantageously, the face of the first plate T1 facing the intermediate plate T3 is partially machined along strips that will be welded to the intermediate plate, such that their thickness is equal to the thickness of the intermediate plate before the stack is placed in the mould. Thus, the thickness of the outer skin of the manufactured structure is approximately constant and its outer surface is perfectly smooth.

According to another aspect of the invention, the width of the cells is made approximately equal to five times the height of the said cells.

Finally, another purpose of the invention is a metallic structure comprising a smooth outer skin, an inner skin and partitions connecting the said skins delimiting adjacent cells between them, characterized by the fact that it is obtained using the previously defined process.

BRIEF DESCRIPTION OF THE DRAWINGS

We will now describe a preferred embodiment of the invention for illustrative purposes without being in any way limitative, with reference to the attached drawings wherein.

DETAILED DESCRIPTION OF A PREFERRED EMBODIMENT OF THE INVENTION

The preferred embodiment of the process according to the invention that will now be described in detail relates to manufacturing a substructure of a leading edge of an aircraft wing. However, it will be understood that this substructure is no more than an example of the different parts that could be obtained by the process according to the invention, and is in no way limitative.

Figure 1:
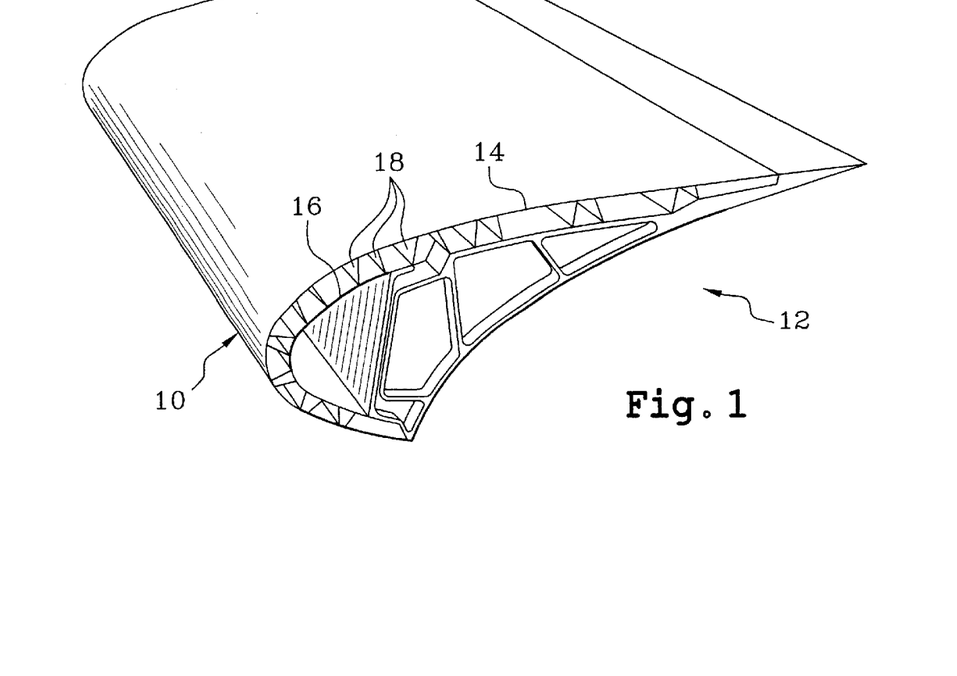
FIG. 1 is a perspective view that diagrammatically shows a mobile leading edge of an aircraft wing, integrating a substructure that might be manufactured by the process according to the invention.

The substructure for which the manufacturing will be described is shown as 10 in FIG. 1, in the case in which it forms part of a mobile leading edge 12 of an aircraft wing. There is a substructure with a similar geometry also located in the fixed leading edges of aircraft wings.

The substructure 10 is composed of thin titanium skins and forms a curved panel. It comprises essentially a smooth and aerodynamic outer skin 14, an inner skin 16 and partitions 18 connecting the skins 14 and 16 by delimiting cells or adjacent grooves 20a and 20b between them as illustrated more precisely in FIG. 2. The partitions 18 and the cells 20a and 20b are arranged along the length of the wing.

As will be described in more detail later, the skins 14 and 16 and the partitions 18 of the panel forming the substructure 10 are obtained by assembling three initially plane titanium plates. More precisely, this assembly is made using the diffusion welding and superplastic forming techniques.

Figure 2:
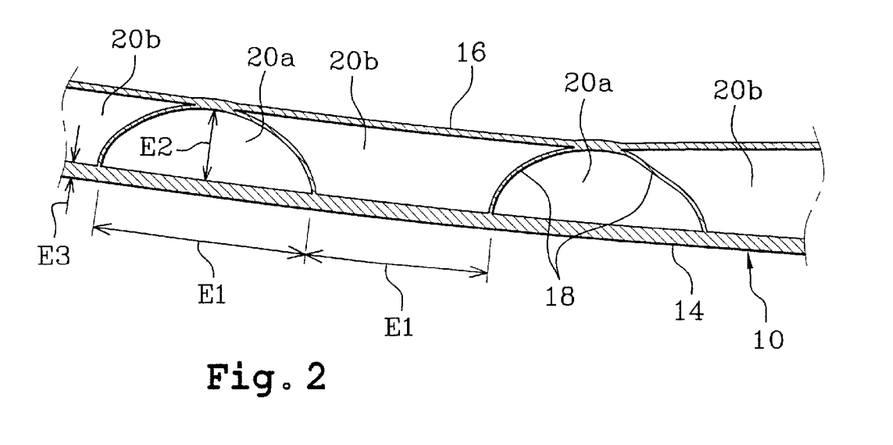
FIG. 2 is a section of the substructure that could be made by the process according to the invention.

In particular, FIG. 2 shows the characteristic dimensions of the cells 20a and 20b of the substructure 10 that is to be made. These dimensions are the width E1 of the cells, on the side of the outer skin 14, the depth E2 of the cells and the thickness E3 of the outer skin 14.

Figure 3:
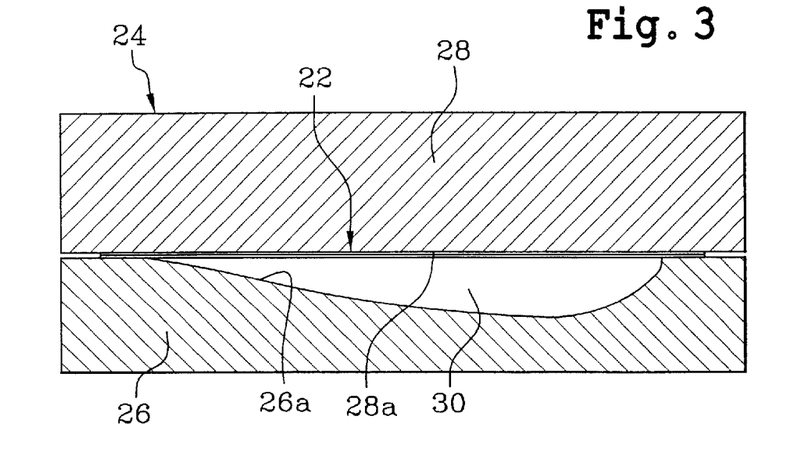
FIG. 3 is a sectional view diagrammatically showing a mould used to make the substructure in FIG. 2, from a stack of three plates.
Figure 4:
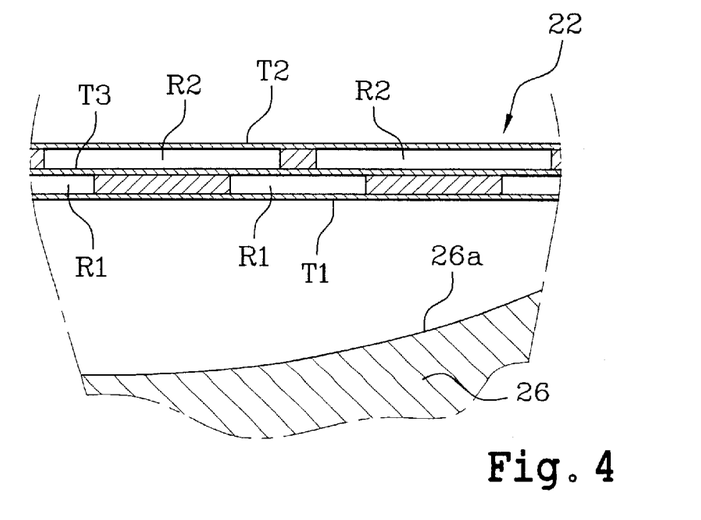
FIG. 4 is a sectional view at larger scale showing the stack of plates placed in the mould in FIG. 3 and areas of application of the anti-diffuser.

As shown more precisely in FIGS. 3 and 4, manufacturing of the substructure 10 begins with the placement of a stack 22 of three plates T1, T2 and T3 that are initially plane, in a mould 24. More precisely, the mould 24 comprises a lower part 26 and an upper part 28 delimiting a closed cavity 30 between them in which the stack of plates 22 is located. The cavity 30 is delimited on the lower part 26 by a surface 26a complementary to the outer skin 14 of the substructure 10 to be made and, on the upper part 28, by a plane surface 28a close to the stack of plates 22.

As illustrated in FIG. 3, the stack of plates 22 is placed in the mould 24 such that the edges of the plates T1, T2 and T3 are held in place by appropriate attachment means (not shown). Thus, the edges of the plates can be held in place between the parts 26 and 28 of the mould 24 by squeezing.

According to procedures known to a person skilled in the art, and therefore that will not be described in detail here, an anti-diffuser is placed between the plates T1, T2 and T3 in all regions of these plates in which assembly is not required during the diffusion welding. These regions, identified by references R1 and R2 in FIG. 4, correspond to the regions in which the cells 20a and 20b will be formed in the substructure 10 to be manufactured.

More precisely, the regions R1 are located between the intermediate plate T3 that will form the partitions 18 and the outer plate T1 facing the surface 26a of the mould and that will form the outer skin 14. Similarly, regions R2 are located between the intermediate plate T3 and the inner plate T2 facing the surface 28a of the mould and that will form the inner skin 16. Furthermore, the width of the regions R1 is equal to E1 and the regions are separated from each other by strips with approximately the same width, that will be welded. Regions R2 are located facing these strips that will be welded, and their width is very much more than E1 so that they are only separated from each other by narrow strips that will be welded.

When the stack of plates 22 has been placed in the mould 24 and the mould has been closed, a first step in the process according to the invention consists of heating the said stack to a temperature at which diffusion welding and plastic deformation of the metal will take place. During this step, the stack of plates 22 is increased to a temperature of about 925° C.

When this temperature is reached, a diffusion welding cycle is carried out on plates T1, T2 and T3, outside regions R1 and R2 that are not to be assembled. This cycle is implemented according to classical procedures well known to an expert in the subject, and consequently it will not be described in detail here.

The next step in the process according to the invention is used to form cells 20a and 20b in the substructure 10 to be made and to form its global shape. Consequently, the stack temperature is kept at about 925° C.

An important characteristic of this step is that two independent forming pressures P1 and P2 are applied simultaneously on the plates in the stack 22. More precisely, the pressure P1 is applied in regions E1 delimited between the outer plate T1 and the intermediate plate T3. The pressure P2 is applied in regions R2 delimited between the inner plate T2 and the intermediate plate T3, and on the face of the inner plate T2 facing the surface 28a and consequently opposite the surface 26a.

Figure 5:
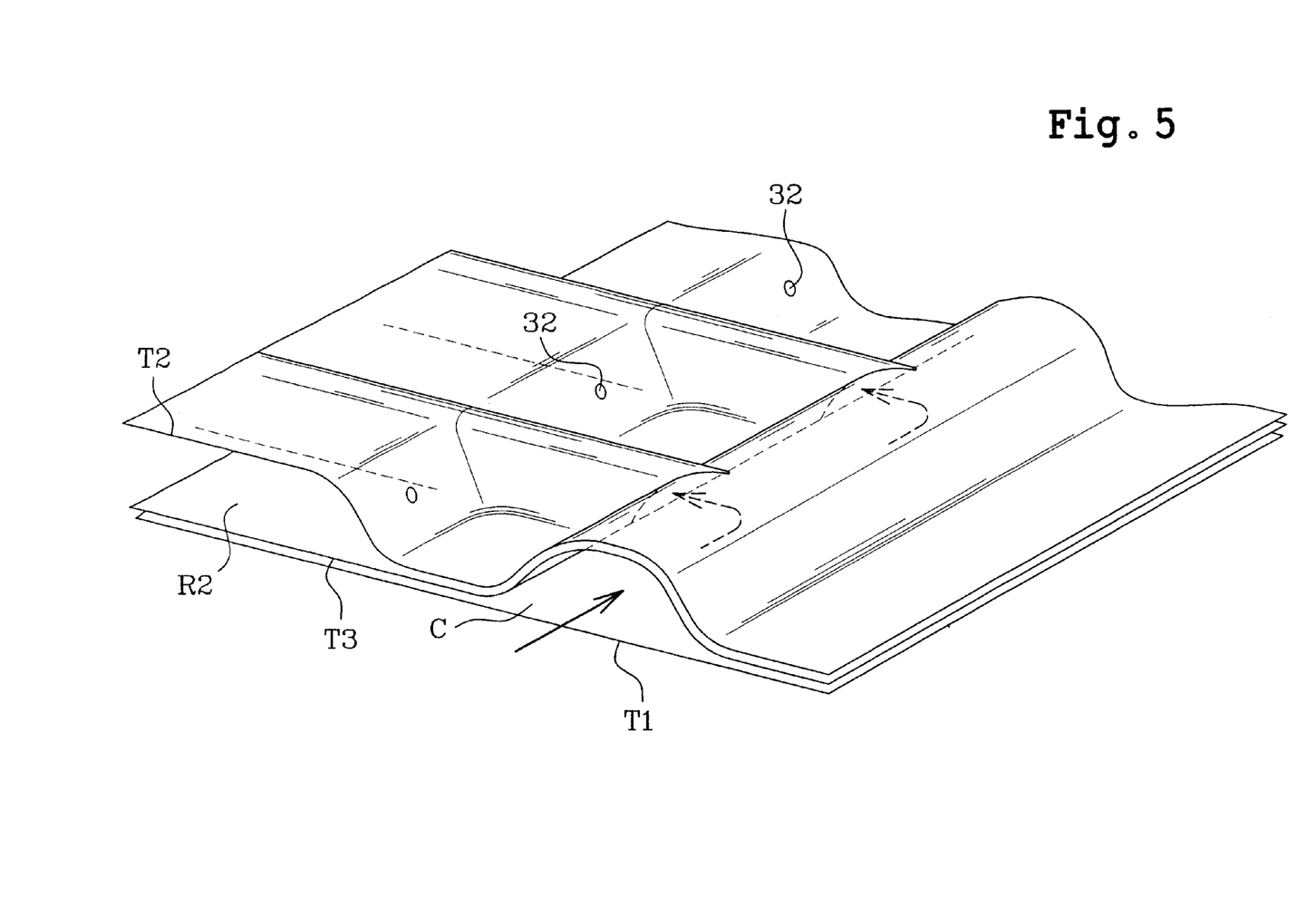
FIG. 5 is a perspective view showing one end of the stack of plates, in particular comprising a pressure supply duct for the first regions, enabling the formation of cells.

In order to achieve an independent pressure supply in regions R1 and R2, FIG. 5 (that shows plates deformed after the process has been implemented) shows that at least one of the ends of each of the regions R1 opens up into a feed or distribution channel C. This channel C is formed at the same time as the regions R1 and R2 by inserting an anti-diffuser at the appropriate location between plates T1 and T3. Pressure is supplied to it through at least one duct (not shown) provided for this purpose in the mould 24.

Furthermore, each of the regions R2 communicates with the outside of the stack of plates 22, on the side of the surface 28a of the mould 24, in other words on the side opposite the surface 26a of the mould 24. This communication is made through holes 32 that pass through the inner plate T2 at the ends of each of the regions R2. Thus, the allowable pressure in the part of the cavity 30 of the mould 24 located between the inner plate T2 and the surface 28a is automatically set up in the regions R2 through these holes 32.

According to the arrangement that has just been described, during a first phase in the pressure cycle a first variable pressure P1 is applied in regions R1 and a second approximately constant pressure P2 is applied simultaneously in regions R2 and in the part of the cavity 30 of the mould 24 between the inner plate T2 and the surface 28a. This second pressure P2 is significantly different from and less than P1.

Figures 6, 7:
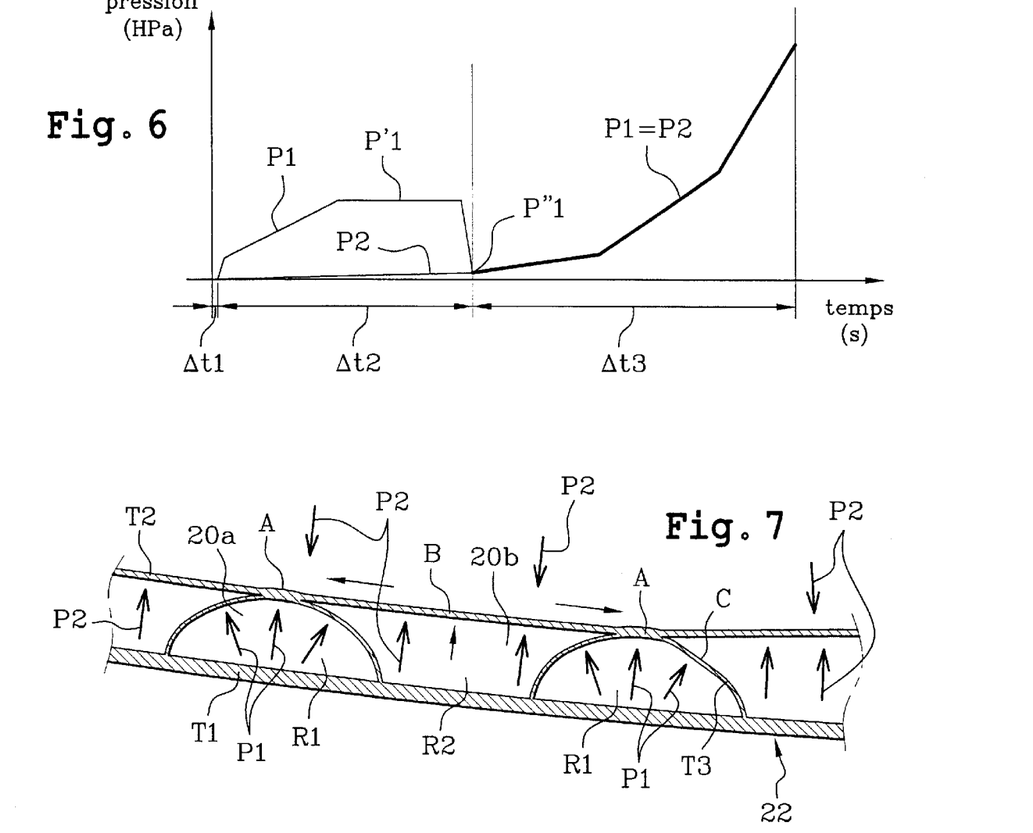
FIG. 6 is a graph that shows the separate variation of the pressure P1 in the first regions R1 and the pressure P2 in the second regions R2, and on the inner face of the stack of plates (in MPa), as a function of the time t (in seconds), during implementation of the process according to the invention.
FIG. 7 shows the shape of the structure at the end of the final conformation step of the outer skin.

More precisely, and as illustrated by the time period Δt2 in FIG. 6, the phase in the process corresponding to the partial formation of the cells 20a and partial shaping of the substructure 10, lasts for about 60 minutes. During this phase, the pressure P2 in regions R2 and in the part of the cavity 30 of the mould 24 located between the inner plate T2 and the surface 28a remains approximately constant and equal to about 1.2 bars absolute.

Simultaneously, the pressure P1 in regions R1 progressively increases until it reaches a value P1' after a time period equal to approximately half the duration of the said phase (in other words about 30 minutes). This value P1' is approximately equal to four times the values of P2. During the second half of the duration of this phase, the pressure P1 remains approximately constant and equal to P1'. At the end of the partial cell formation phase, the pressure P1 drops back very quickly to reach a value P1" equal to approximately P2.

The first effect of injecting a relatively high pressure P1 in regions R1 and a relatively low pressure P2 in regions R2 and in the part of the cavity 30 of the mould 24 located between the inner plate T2 and the surface 28a is to open and partially form cells 20a and 20b. The differential pressure between P1 and P2 also has the effect of simultaneously displacing the inner plate T2 and the outer plate T1 towards the surface 26a of the cavity 30 of the mould 24, and applying them globally in contact with the said surface.

During a final step in the process according to the invention that corresponds to the time period Δt3 in FIG. 6, the pressures P1 and P2 remain equal while increasing uniformly up to a value equal to approximately 9 bars. The duration of this step is equal to approximately the duration of the time period Δt2 corresponding to the previous step in which cells 20a and 20b are partially formed, in other words about 60 minutes.

This final step in the process according to the invention achieves final conformation of the outer skin 14, while applying it completely in contact with surface 26a. It also controls the final complete formation of cells 20a and 20b. The effect of this final step is illustrated in FIG. 7, which represents the shape of the structure at the end of the said step.

In particular, FIG. 7 illustrates the action of pressures P1 and P2 on the skins of the panel and the role played by the surface 26a of the mould 24 for conformation of the outer skin to the contour of the leading edge. FIG. 7 also shows the final formation of cells 20a and 20b.

Figure 9:
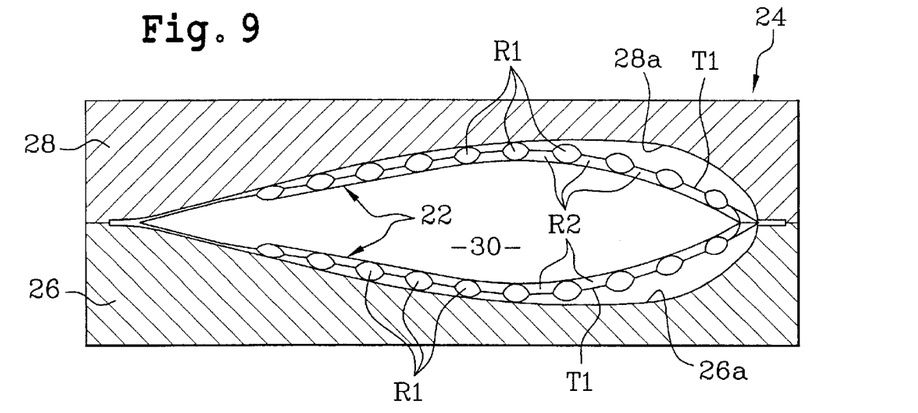
FIGS. 9 and 10 show views similar to FIG. 8, that illustrate two successive steps in the first phase of the process, and, FIG. 11 is a view comparable to FIGS. 8 to 10 that illustrates the second phase of the process according to the invention.

During the first phase of the process (period Δt1 in FIG. 6), the parts A of the inner plate T2 welded to the intermediate plate T3 move away from the outer plate T1 which is then progressively forced into contact with the mould (see FIG. 9). Inflation of regions R1 corresponding to cells 20a induces a significant elongation of the parts C of the intermediate plate T3 corresponding to the partitions 18 of the substructure 10 to be made. The result is that parts B of the inner plate T2 between parts A are put under tension. The tension applied to the inner plate T2 causes it to move inwards, in other words to move it away from the outer plate T1 (see FIG. 10) until plane parts B are obtained between the successive parts A (see FIGS. 7 and 11).

Test results have shown that optimum production of a substructure 10 of a leading edge using the process according to the invention depends on the characteristic dimensions E1, E2 and E3 applied to cells 20a and 20b. Thus, in the case of a leading edge substructure that will be used for suction of the boundary layer and occasionally for de-icing by blowing warm air through the porous outer skin 14, the optimum dimensions are obtained for an average thickness E3 of the outer skin 14 uniformly equal to 0.9 mm, and for a cell width E1 equal to approximately 5 times the height E2 (see FIG. 2). For example, if the height E2 of the cells is 5 mm, then the width E1 is 25 mm.

These characteristic geometric values E1, E2 and E3 are adjusted by adapting the operational parameters of the process.

Thus, the final value of the cell width E1 depends on the initial definition of this width and the relative spacing of the diffusion welding strips (parts A in FIG. 7) in the stack of plates 22.

The final value of the height of the cell E2 is obtained mainly by adjusting the value of the pressure P1' applied in regions R1 during the first phase of the process that is the main factor in inflation of the cells.

Finally, the uniformity of the thickness E3 of the outer skin 14 may be obtained by chemically machining the outer plate T1 on its inner face facing the intermediate plate T3, along the strips forming the welding areas with the intermediate plate. At these locations, the local thickness of the outer plate T1 is reduced by a value equal to the thickness of the intermediate plate T3 (which is thinner).

When the substructure will be used for suction of the boundary layer and/or de-icing by blowing warm air, the outer skin 14 may be made uniformly porous after assembly, for example using a laser beam micro perforation technique. The structure obtained is then connected to a pneumatic distribution system that enables either suction of part of the external flow in order to control the boundary layer, or blowing of warm air to prevent icing of the outer skin, through the porous skin.

As shown diagrammatically in FIGS. 8 to 11, the process according to the invention can also be used to simultaneously make two substructures 10. In this case, a mould 24 is used in which the two parts 26 and 28 are for example symmetric about the joint plane. In particular, the cavity 30 of the mould is then delimited at its lower part 26 by a surface 26a complementary to the outer skin 14 of a first substructure 10 to be made, and on the upper part 28 by a surface 28a complementary to the outer skin 14 of the second substructure 10 to be made.

In this case, two stacks 22 of three plates are placed between two parts 26 and 28 of the mould 24, such that the outer plates T1 of each of the stacks 22 are located on the outside facing surfaces 26a and 28a respectively. An anti-diffuser film is then also placed between the adjacent faces of the inner plates T2.

Figure 8:
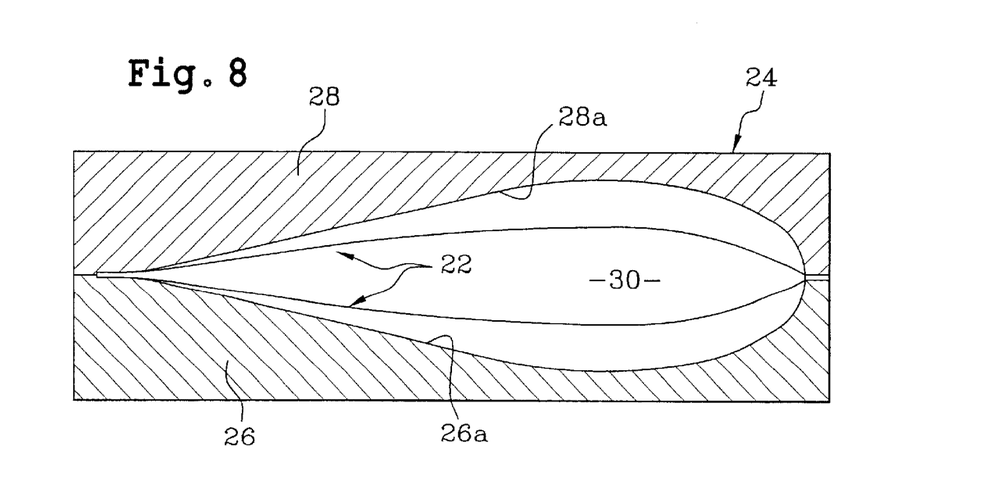
FIG. 8 is a diagrammatic sectional view that illustrates a preliminary phase of the process during simultaneous manufacturing of two subassemblies in the same mould.

As shown in FIG. 8 and as also shown on the graph in FIG. 6, the first phase of the process corresponds to partial formation of the cells, and forming of the substructures is preceded by application of a preliminary pressure cycle with a very short duration Δt1. The function of this preliminary pressure cycle is to separate the two stacks (FIG. 8). It is characterized by the application of an identical low pressure in regions R1 and R2, and between the adjacent faces of the inner plates T2.

In practice, the duration Δt1 of the preliminary pressure cycle may for example be about 1 minute and the applied pressure is about 1.2 bars absolute.

Figure 10:
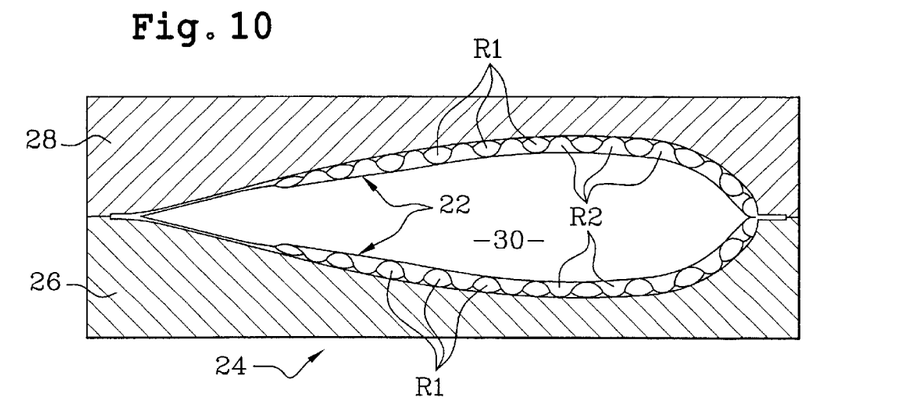
Figure 11:
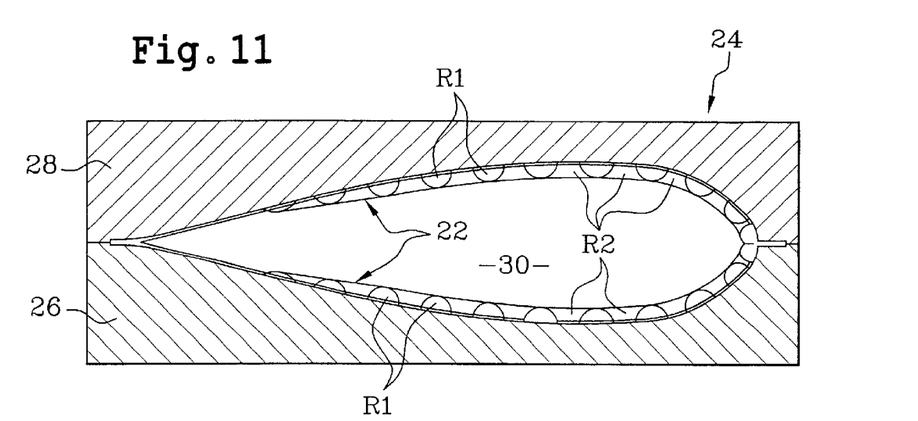

As illustrated in FIGS. 9 and 10 in sequence, the preliminary phase in the pressure cycle is followed by a step for the partial formation of the cells and for forming the structure, during which a first phase of the pressure cycle is carried out. During this first phase, a first variable pressure is applied in regions R1 and a low and constant pressure is applied in regions R2 and between the two stacks. This step is identical to the step that was described previously if a single substructure is made.

The same is true for the next step for final conformation of the cells and the outer skins, during which the same pressure is applied in the regions R1 and R2 and between the stacks.

Thus, the process according to the invention can be used to make one or two cellular metallic structures at the same time with a smooth outer surface using the SPFDB technique, in a particularly simple and inexpensive manner.

Obviously, the invention is not restricted to the embodiment method that has been described, but it covers all variants of it.

We claim:

1. Process for manufacturing at least one metallic structure comprising a smooth outer skin, an inner skin and partitions connecting said skins by delimiting adjacent cells from each other, said process comprising the following successive steps: placing at least one stack of three metallic plates superposed in a mold, said mold comprising a surface complementary to the smooth outer skin of the structure to be made, inserting an anti-diffuser between the plates in regions that are not to be assembled; heating the stack of plates and executing a plate diffusion welding cycle, outside said regions that are not to be assembled; partially forming the cells and shaping the structure with a first phase in a pressure cycle, consisting of applying a first pressure in first regions delimited between a first plate adjacent to said surface of the mold and an intermediate plate in said stack and applying a second approximately constant pressure independent of and lower than the first pressure, on the face of the third plate opposite said surface and in second regions delimited between the third plate and the intermediate plate; final conformation of the cells and the outer skin by carrying out a second phase in the pressure cycle consisting of simultaneously applying an approximately equal pressure in the first and second regions and on said face of the third plate.

2. Manufacturing process according to claim 1, wherein the first pressure applied in the first regions increases progressively up to a predetermined value during about a first half of the duration of the first phase of the pressure cycle, and then remains constant until the end of the first phase, when the first pressure goes down very quickly to a value equal to the value of the second pressure applied in the second regions and on said face of the third plate.

3. Manufacturing process according to claim 2, wherein the predetermined value of the first pressure applied in the first regions is approximately equal to four times the second pressure applied in the second regions and on said face of the third plate.

4. Manufacturing process according to claim 2, wherein the total duration of the first pressure cycle is about 60 minutes.

5. Manufacturing process according to claim 2, wherein the pressure in the second regions and on said face of the third plate remains approximately constant and equal to about one bar during the first phase of the pressure cycle.

6. Manufacturing process according to claim 1, wherein the pressures in the first and second regions and on said face of the third plate increase regularly during the second phase of the pressure cycle until a final determined pressure is obtained.

7. Manufacturing process according to claim 6, wherein the final pressure is about 9 bars.

8. Manufacturing process according to claim 1, wherein the duration of the second phase of the pressure cycle is approximately equal to the duration of the first phase of the pressure cycle.

9. Manufacturing process according to claim 1, wherein two stacks of plates are placed simultaneously in the mold and the said stacks are separated during a preliminary phase of the pressure cycle, during which a low and identical pressure is applied for a very short time in the first and second regions and on the said face of the third plate, the preliminary phase of the pressure cycle preceding the first phase of the pressure cycle.

10. Manufacturing process according to claim 9, wherein the preliminary phase of the pressure cycle lasts for about one minute and the pressure applied during this preliminary phase is about 1.2 bars absolute.

11. Manufacturing process according to claim 1, wherein the first pressure is applied through at least one distribution channel towards which the first regions open up.

12. Manufacturing process according to claim 1, wherein the face of the first plate facing the intermediate plate is machined along strips that will be welded to the intermediate plate, over a thickness equal to the thickness of the intermediate plate, before the stack is placed in the mold, such that the thickness of the outer skin of the manufactured structure is approximately constant.

13. Manufacturing process according to claim 1, wherein the width of the cells is made approximately equal to five times the height of the said cells.

* * * * *